April 17, 1928.
Re. 16,936
C. R. SHAFER
BOX CONSTRUCTION
Original Filed Sept. 27, 1920
Fig. 2.
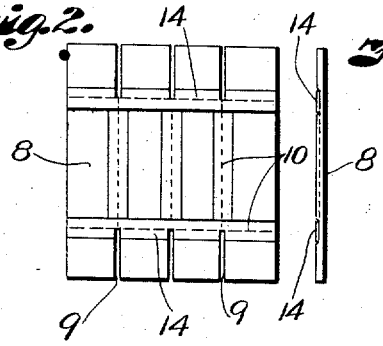
Fig. 3.
Fig. 1
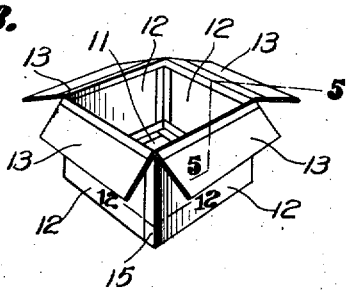
Fig. 4.
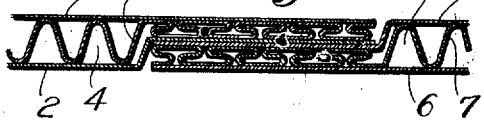
Fig. 5.
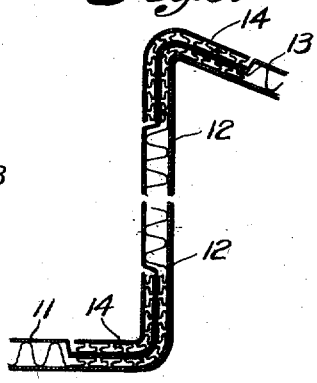
Fig. 7.
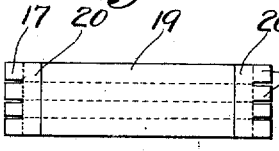
Fig. 6.
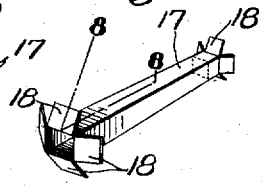
Fig. 11.
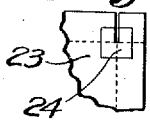
Fig. 10.
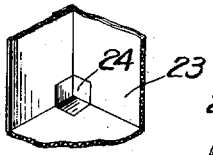
Fig. 9.
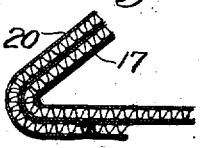
Fig. 8.
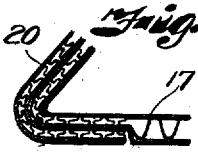
Fig. 14.
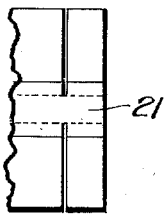
Fig. 12.
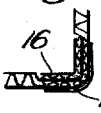
Fig. 15
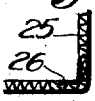
Fig. 13.
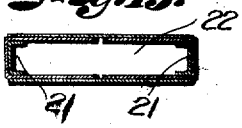
INVENTOR
Carl R. Shafer
By Arthur C. Brown
ATTORNEY Reissued Apr. 17, 1928. Re. 16,936

UNITED STATES PATENT OFFICE.

CARL R. SHAFER, OF DETROIT, MICHIGAN, ASSIGNOR TO BOX PATENTS CORPORATION, OF BORDENTOWN, NEW JERSEY, A CORPORATION OF NEW JERSEY.

BOX CONSTRUCTION.

Original No. 1,417,776, dated May 30, 1922, Serial No. 413,132, filed September 27, 1920. Application for reissue filed May 21, 1926. Serial No. 110,827.

This invention relates to paper containers as boxes, cartons, parcel post wrappers, and receptacles which possess a minimum weight without sacrificing strength, and rigidity. As an example of such receptacle may be mentioned a corrugated card-board box, made of sheet material, preferably consisting of two plain sheets with an intervening corrugated sheet and known to the trade as "double-faced corrugated cardboard." The material is also known as cellular fabric and in the making of boxes, of various sizes and shapes, from such cardboard or fabric, it is necessary to bend or fold the cardboard or fabric and consequently weaken the same at such bends or folds. Sometimes the material is cracked or its cellular formation disrupted. Then again, material may be subjected by such bending or folding to a strain or unnatural condition which eventually causes the material to break.

My invention, in its broadest aspect, involves a reinforcement for cellular material, also, a method of producing the reinforcement, and it is in this connection that the result of my invention is a new product or an article of manufacture.

My invention, in other respects, aims to increase the longevity of paper containers by reinforcing weak portions thereof; to reinforce those parts of the container subjected to the most handling and wear, and, to change the internal cellular formation of material so as to make it more durable and applicable to many uses.

Various ways of carrying my invention into effect are showed in the drawing wherein;

Figure 1 is a perspective view of a container having its angular or connected portions stiffened or reinforced in accordance with my invention, the container being shown open to show that reinforcements may be applied to either the inner or outer walls thereof;

Fig. 2 is a plan of a blank from which the paper container may be made, showing the reinforced portions thereof;

Fig. 3 is an edge view of the blank;

Fig. 4 is an enlarged cross sectional view of a piece of cardboard or cellular material which is reinforced or made in accordance with this invention;

Fig. 5 is an enlarged fragmentary sectional view taken on the line V—V of Fig. 1;

Fig. 6 is a perspective view of an oblong box-like container having lid or end portions reinforced in accordance with my invention.

Fig. 7 is a plan of a blank from which the container, shown in Fig. 6, may be made;

Fig. 8 is an enlarged detail sectional view taken on the line VIII—VIII of Fig. 6, showing the reinforcement applied at a bend of the material;

Fig. 9 is a similar view illustrating a slight modification of my invention;

Fig. 10 is a perspective view of a plurality of walls, for instance, the corner of a box, having a reinforcement or insert at the juncture of the walls;

Fig. 11 is a plan of a portion of a blank from which the structure, shown in Fig. 10, may be formed;

Fig. 12 is a horizontal sectional view taken on the line XII—XII of Fig. 1;

Fig. 13 is a vertical longitudinal sectional view of an oblong receptacle having side and end portions reinforced in accordance with this invention;

Fig. 14 is a plan of a portion of the blank from which the receptacle, shown in Fig. 13, may be formed, and Fig. 15 is a horizontal sectional view of angular wall portions having an angular reinforcement.

As set forth in the beginning a piece of cardboard or cellular material from which I form containers is preferably composed of two parallel sheets 1 and 2 and an intervening corrugated sheet 3 having its fluted or cellular portions suitably connected to the confronting walls of the sheets 1 and 2 to maintain the sheets in spaced relation and the formation of longitudinal parallel cells 4. Such material is yieldable in a direction transverse to its surface, although substantially rigid in its general plane of extent, and may be considered as three-ply and bendable along the lines of its flutes or corrugations, without having its cellular formation materially changed. The material is also bendable along the lines transversely of its flutes or cells but such bending often tends to break one or the other of the sheets and disrupt the cellular formation of the material.

To reinforce or strengthen such a three-ply cellular piece of material at its bends, weak points or wear spots, I use a similar piece of material having sheets 5 and 6 corresponding to the sheets 1 and 2 and a sheet 7 corresponding to the sheet 3. The material composed of the sheets 1, 2 and 3 may be considered as a supporting piece of material, such as a body blank, and the material composed of the similar elements 5, 6 and 7 as a reinforcement or insert, such as a reinforcing strip. The reinforcement may be placed on any portion of the supporting piece of material and subjected to pressure until the reinforcement, in part or as a whole, is countersunk. In Fig. 4 is illustrated a modification of the structure wherein the edges of two of such pieces of material are overlapped and compressed, forming a joint composed of the sheets 1, 2 and 3 of one piece and corresponding sheets 5, 6 and 7 of the other piece. In other words, pressure is applied until the marginal portion of each piece of material is flattened and compressed into a thickness which permits of one piece of material remaining substantially flush with the other, the sheets 1 and 5 being in a common plane and the sheets 2 and 6 in a similar plane parallel to the sheets 1 and 5. The marginal portion of the sheet 2 and the marginal portion of the sheet 5 are brought into parallel relation and in consequence of pressure having been applied to produce this result the cellular formation of the compressed portions of the material is changed.

The conformation of the cells 4 is such that the major axes thereof, considering a cross sectional view, are at a right angle to the sheets or side walls of the material, but after the material is subjected to pressure the cells are more or less collapsed so that the major axes are parallel to the sheets or walls of the material. In consequence of such collapse the original three-ply piece of material is converted into a five-ply piece of material and when the marginal portions of the two pieces of material are held together, as shown in Fig. 4, there are ten plies of material where the two pieces are joined.

Rolls, presses or any suitable means may be employed for subjecting the supporting and reinforcing materials to pressure;—preferably rolls, because the pass between rolls can be set for the thickness of the supporting piece of material and then the reinforcing piece of material placed in proper relation to the supporting piece of material to be joined thereto. Juncture may be effected by the use of glue or a suitable adhesive, although mechanical means may be employed in some instances, and in using rolls to change the cellular formation and smooth out the overlapping relation of two pieces of material, it is possible to place the reinforcing material directly on top of a supporting piece of material and have it press into or countersunk, as an insert, relative to the supporting piece of material. It is in this connection that pieces of cellular material which have been punctured, cracked or otherwise injured may be reinforced by patches or inserts applied thereto.

With this preliminary understanding of the manner in which a piece of supporting material may be reinforced, reference will now be had to Figs. 1, 2, 3 and 5 showing a conventional form of paper container or box made from a blank 8 provided with slots or slits 9 and adapted to be bent or folded on the dotted lines 10 so as to form a rectangular structure having a bottom wall 11, side walls 12 and lids 13 which close the structure and form the top thereof. In bending the blank 8 on the dotted lines 10 it is apparent that the cells of the blank material are changed at the bends and if the material is not weakened at the bends it is subjected to strains. If the paper box is roughly handled the material will give way at the bends and thus destroy the usefulness of the box. To strengthen or reinforce each bending zone of the box I provide the blank 8 with reinforcing material in the form of strips 14 and these strips are pressed into the blank until the exposed surfaces thereof are flush with the wall of the blank, as best brought out in Fig. 3. Now, when the blank is folded to provide a box all of the corners and edges of the box are stiffened, just as though a frame surrounded each wall of the box. To maintain the blank in its folded box form the connecting strip 15 may be employed against the other sides of the wall 12 where the ends of the blank meet, and as further shown in Fig. 12 an angular reinforcing member 16 may be pressed into the walls 12 at their juncture.

Just how the bent zones of the box are reinforced may be noted in Fig. 5 where it will be observed that the original formation of the cellular material is maintained for the body of each wall, but where the strips 14 have been pressed into the wall the cellular formation is changed to increase the number of plies and build up the material so that it will withstand considerable pressure and rough handling before being broken.

There are certain forms of boxes or containers where the end portions of the boxes are subjected to greater wear and tear than other portions and this has been brought out in Figs. 6 and 7 showing an oblong box 17 having end flaps or lids 18 adapted to close the ends of the box. The blank from which this box is made is designated 19 and it has its ends provided with reinforcing members 20 so that the flaps or lids 18 and the ends of the box body will be of double thickness with the reinforcing members pressed into the supporting material. As shown in Fig. 8 the reinforcing member may be pressed into the inner wall of the blank, and as shown in Fig. 9, I may apply the reinforcing member without necessarily pressing it into the supporting material. It is in this connection that I am aware of certain types of shipping boxes made of laminated material, for instance, two boards glued or otherwise secured together and it is obvious that such boxes require considerable material and have portions thereof unnecessarily reinforced. These same boxes may be made as suggested in Figs. 6, 7 and 9, and consequently there will be a great saving of material between the ends of the boxes or those portions of double thickness. It is possible to make the boxes without using two complete blanks, and consequently the weight limits of boxes may be increased and boxes made much larger. Furthermore reinforcements in accordance with my invention may be applied intermediate the bendable portions of a wall and in such directions as to stiffen and brace a wall.

In Figs. 13 and 14 there is illustrated an oblong structure having its sides and top and bottom edges reinforced, the box being designated 22 and having a reinforcing member 21. In the construction of some boxes from blanks it is necessary to slot the blanks to provide desired walls and the slots of such blanks extend close to bendable portions of the blank, thereby weakening such portions. This may be noted in Fig. 14, but it will also be observed that the reinforcing member 21 stiffens and lends rigidity to the material about the slots and in consequence of such construction a more durable box is obtained. The reinforcing member 21 may be pressed in either wall of the blank, or it may be applied to the blank without being pressed therein.

Again there are certain forms of containers where it may be only necessary to reinforce the corners thereof and in such instances a blank 23 may have a reinforcing insert 24 pressed into it so that when the walls of the blank are placed in angular relation, as shown in Fig. 10, the reinforcing insert 24 will stiffen and add rigidity to the corner of the container. The reinforcing insert may be either on the inside or outside of the container.

While my invention has special reference to the use of cellular material for reinforcing members, it may be desirable to use a solid board or material, for instance, fibroid, so in Fig. 15 I show a cellular board wall 25 having an angular reinforcing member 26 of solid material.

From the foregoing it will be observed that I have devised a method of increasing the cellular formation of material by placing two pieces of material together and then subjecting the pieces of material to pressure until the cellular formation of each piece of material is increased. When this takes place with a portion of one piece of material overlapping another portion of material the joined portions are maintained at practically the uniform thicknesses of the remaining portions of the material, so that practically a homogeneous sheet of material is formed having a reinforced portion represented by the overlapped pressed together edges of the material. I attach considerable importance to the fact that such a sheet of material has its reinforced portion of ten plies in contradistinction to the three plies in remaining portions of material, considering that ordinary corrugated cardboard is used, and while in the drawing there is illustrated what I now consider as the preferred embodiments of my invention, I would have it understood that my invention is susceptible to such changes and modifications as fall within the scope of the appended claims.

What I claim and desire to secure by Letters Patent is:—

1. As a new article of manufacture, a container having walls made of cellular material having an inset cellular reinforcement, the installation of which changes the original shape of the cells of the reinforcement and of the material.

2. As a new article of manufacture, a container having walls composed of two overlying three-ply cellular pieces of material pressed to the original thickness of one piece of material to afford a wall comprising a ten-ply piece of cellular material.

3. A container made from a blank having integral body and flap members and an inset comprising integral symmetrical halves having a common edge coinciding with and extending along the line of juncture of the members, and a reinforcing strip filling the inset and terminating substantially flush with the face of the blank.

4. A container made from a blank having integral body and flap members, and having a divided inset in one face, the dividing line extending along the line of juncture of said members, and a reinforcing strip filling the inset and terminating substantially flush with the face of the blank, the reinforced and body portions of the blank having the same thickness but different density.

In testimony whereof I affix my signature.

CARL R. SHAFER.